(12) United States Patent
Nice et al.

(10) Patent No.: US 7,680,263 B2
(45) Date of Patent: Mar. 16, 2010

(54) AGENT DETECTOR, WITH OPTIONAL AGENT RECOGNITION AND LOG-IN CAPABILITIES, AND OPTIONAL PORTABLE CALL HISTORY STORAGE

(75) Inventors: Pamela Nice, Calgary (CA); Paul Martin, Calgary (CA); Randy Locke, Napean (CA); Jason Bartal, Calgary (CA); John Melbourn, Calgary (CA); Gordon Galletti, Guelph (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1309 days.

(21) Appl. No.: 10/902,639

(22) Filed: Jul. 29, 2004

(65) Prior Publication Data

US 2006/0023865 A1 Feb. 2, 2006

(51) Int. Cl.
*H04M 5/00* (2006.01)
(52) U.S. Cl. ............................ 379/265.04; 379/265.11
(58) Field of Classification Search ............ 379/201.06, 379/265.01–266.1
See application file for complete search history.

(56) References Cited

U.S. PATENT DOCUMENTS

| | | | | | |
|---|---|---|---|---|---|
| 6,140,921 | A * | 10/2000 | Baron et al. | ................ | 340/540 |
| 6,278,877 | B1 * | 8/2001 | Brederveld et al. | ......... | 455/434 |
| 6,282,154 | B1 * | 8/2001 | Webb | ......................... | 704/275 |
| 6,330,325 | B1 * | 12/2001 | Reid et al. | ............. | 379/265.01 |
| 6,965,669 | B2 * | 11/2005 | Bickford et al. | ........ | 379/265.07 |
| 2002/0085701 | A1 * | 7/2002 | Parsons et al. | ......... | 379/211.01 |
| 2002/0171546 | A1 * | 11/2002 | Evans et al. | ................. | 340/540 |
| 2003/0033252 | A1 * | 2/2003 | Buttridge et al. | ............. | 705/45 |
| 2003/0177370 | A1 * | 9/2003 | Smith | ........................ | 713/186 |

OTHER PUBLICATIONS

Renshaw, Radio Frequency Identification Tags Work For People, Too, Financial Post, Monday, Feb. 2, 2004, 1 pg.

* cited by examiner

*Primary Examiner*—Fan Tsang
*Assistant Examiner*—Akelaw A Teshale
(74) *Attorney, Agent, or Firm*—David A. Dagg

(57) ABSTRACT

A system for accurately detecting the unavailability of a call center agent that uses one or more agent sensors provided in the area of the agent's desk or station that are triggered when the agent moves into or out of the physical area in which he or she can answer calls. The agent sensor may be an external hardware peripheral device which communicates with a call center software application. The agent sensor operates to notify the call center application when an associated agent leaves their desk, so that the call center application can make that agent unavailable to receive calls as a result. When the agent returns, another signal may be sent from the sensor to the call center application indicating that the agent is again available to receive calls. The information gathered by the call center application from the sensor signals may be used to assist in report generation regarding call center agents, and to improve call center performance, since calls are not forwarded to agents that have stepped away from their desk, even for a brief moment.

28 Claims, 7 Drawing Sheets

AGENT DETECTOR, WITH OPTIONAL AGENT RECOGNITION AND LOG-IN CAPABILITIES, AND OPTIONAL PORTABLE CALL HISTORY STORAGE

FIELD OF THE INVENTION

The present invention relates generally to call center operations, and more specifically to a method and system for detecting whether a call agent is physically present in a location making him or her available to receive a call, and optionally for automatically recognizing and logging an agent into the call handling system, and optionally storing call information for an agent in a portable digital storage device the agent can carry with them.

BACKGROUND OF THE INVENTION

Call centers are increasingly used to provide telephone based customer service support of many types, including sales, technical support, and others. Calls to a telephone number supported through a call center are routed by call center application software to specific individuals, referred to as "agents", that provide various kinds of information, sales support, and/or other types of support relevant to specific calls. Call center application software operates to route received calls to appropriate agents based on agent availability, and/or one or more items of information provided by the caller, such as the dialed number, and/or caller provided voice or key pad information indicating a requested service, product type, caller's native language, etc.

When an agent leaves his or her station or desk, that agent typically becomes unavailable to handle calls that are routed to that station or desk. The call center application software needs to be informed of such an event, in order to prevent calls being routed to a place where no agent is currently available. In some existing systems, when an agent is going to leave their desk, the agent must manually invoke a feature on their telephone equipment, such as a switch or button on a telephone headset, to inform the call center application software that they are becoming unavailable to receive calls. However, if an agent forgets to explicitly invoke such a manual feature, or for any reason fails to use it, that agent may still be considered available to receive a call. As a result, a call may still be forwarded to that agent's telephone equipment, and the call would not be picked up. After the call rings for some period of time, it may be forwarded back to a received call queue, and eventually routed to another agent. From the caller's perspective, such a sequence of events may be confusing, since they may hear an initial greeting message, then ringing as a result of the call being routed to the unavailable agent, then possibly another greeting message when the call is forwarded back to the received call queue, and then ringing again when the call is forwarded to another agent's desk. Other existing systems have required the agent to enter a special code into equipment at the agent's desk when they leave their work area. These approaches have proven inadequate in preventing calls from being routed to unavailable agents, since agents may not remember to manually indicate their absence, or enter a necessary feature code correctly.

For the above reasons it would be desirable to have a new system for providing an indication that a call center agent is unavailable to receive a call. The new system should avoid the need for an agent to manually invoke a headset feature such as a button or switch, but provide accurate indications of the agent's availability status. Additionally, the new system should require a minimal amount of call center agent training to be effective. It would further be advantageous for the new system to provide automatic recognition and log-in of an agent when they are ready to receive calls, and to digitally store call history information in a device that is portable to the agent.

SUMMARY OF THE INVENTION

To address the above described and other shortcomings of previous systems, a system and method for detecting the unavailability of a call center agent is disclosed that uses one or more agent sensors provided in the area of the agent's desk or station, and that are triggered when the agent moves into or out of the physical area within which he or she can answer calls. The disclosed agent sensor may include a hardware device which communicates with a received call processing system. The agent sensor operates to notify the received call processing system when an associated agent leaves their desk, so that the received call processing system can avoid routing received calls to a phone which will not be picked up. When the agent returns, another signal may be sent from the sensor to the received call processing system indicating that the agent is again available to receive calls. The information gathered by the received call processing system from the sensor signals may also be used in report generation for call center agents. The disclosed system generally improves call center performance since calls are not forwarded to agents that have stepped away from their desk, even for a brief moment.

In another aspect of the disclosed system, an agent that has become ready to receive calls is automatically identified, for example by use of biometric feedback systems programmed or configured to identify individual agents based on physical characteristics detected using biometric detecting devices, such as digital cameras or the like. In another aspect of the disclosed system, a call history of an agent may stored in a portable data storage device that the agent can carry with them from call station to call station. The portable data storage device may also be used to store identification information for an agent, for purposes of logging the agent in at a call center work station.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
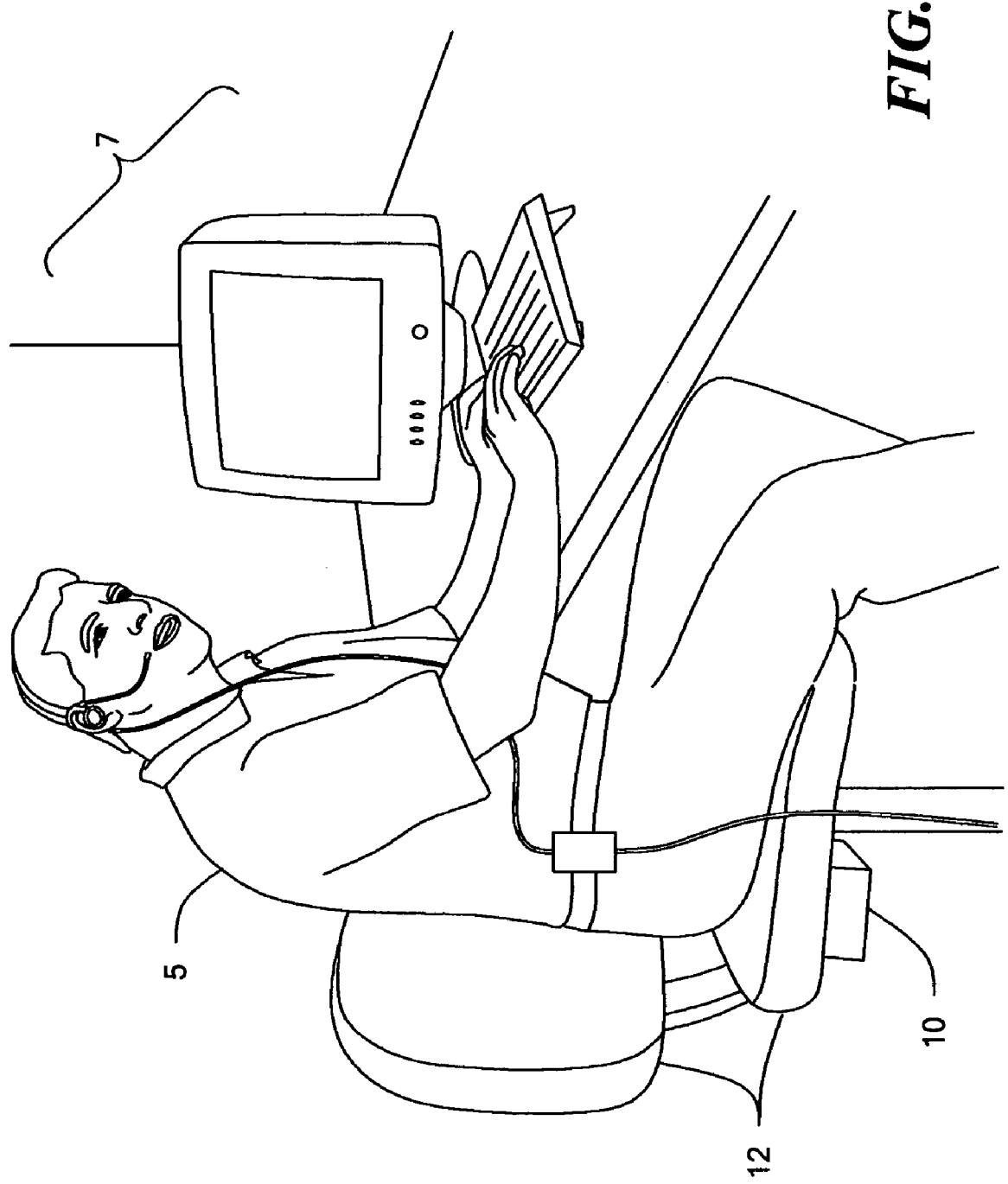
FIG. 1 shows a call center agent at a call center station, with an agent sensor located in the seating equipment of the station.

As shown in FIG. 1, in accordance with an illustrative embodiment of the disclosed system, a call center agent 5 is shown at a call center station 7. An agent sensor 10 is shown located in the seating equipment 12 of the call center station 7. The call center station 7 is shown for illustrative purposes as an example of a work area for a call center agent in a call center facility. The agent sensor 10 may consist of any specific type of sensor device that is capable of detecting when the agent 5 is seated in the seating equipment 12. For example, the agent sensor 10 may be a device that is sensitive to levels of pressure, motion, heat, or any other condition or event indicative of the agent 5 being seated in the seating equipment 12. While in the illustrative embodiment of FIG. 1, the agent sensor 10 is shown positioned in a seat portion of the seating equipment 12, it may alternatively or additionally be located anywhere in the seating equipment 12 that may be appropriate.

When the agent sensor 10 detects that the agent 5 is seated in the seating equipment 12, a signal or message is sent to a call processing system in the call center indicating that the agent 5 is available to receive calls through telephone equipment located in the call center station 7. When the agent sensor 10 detects that the agent 5 is not seated in the seating equipment 12, the agent sensor 10 sends another signal or message indicating that the agent 5 is not available to receive calls at the call center station 7. Communications between the agent sensor 10 and the call processing system in the call center may be supported through any appropriate type of communication system, such as a wired or wireless Local Area Network (LAN) interconnecting the agent sensor 10 and the call processing system.

Figure 2:
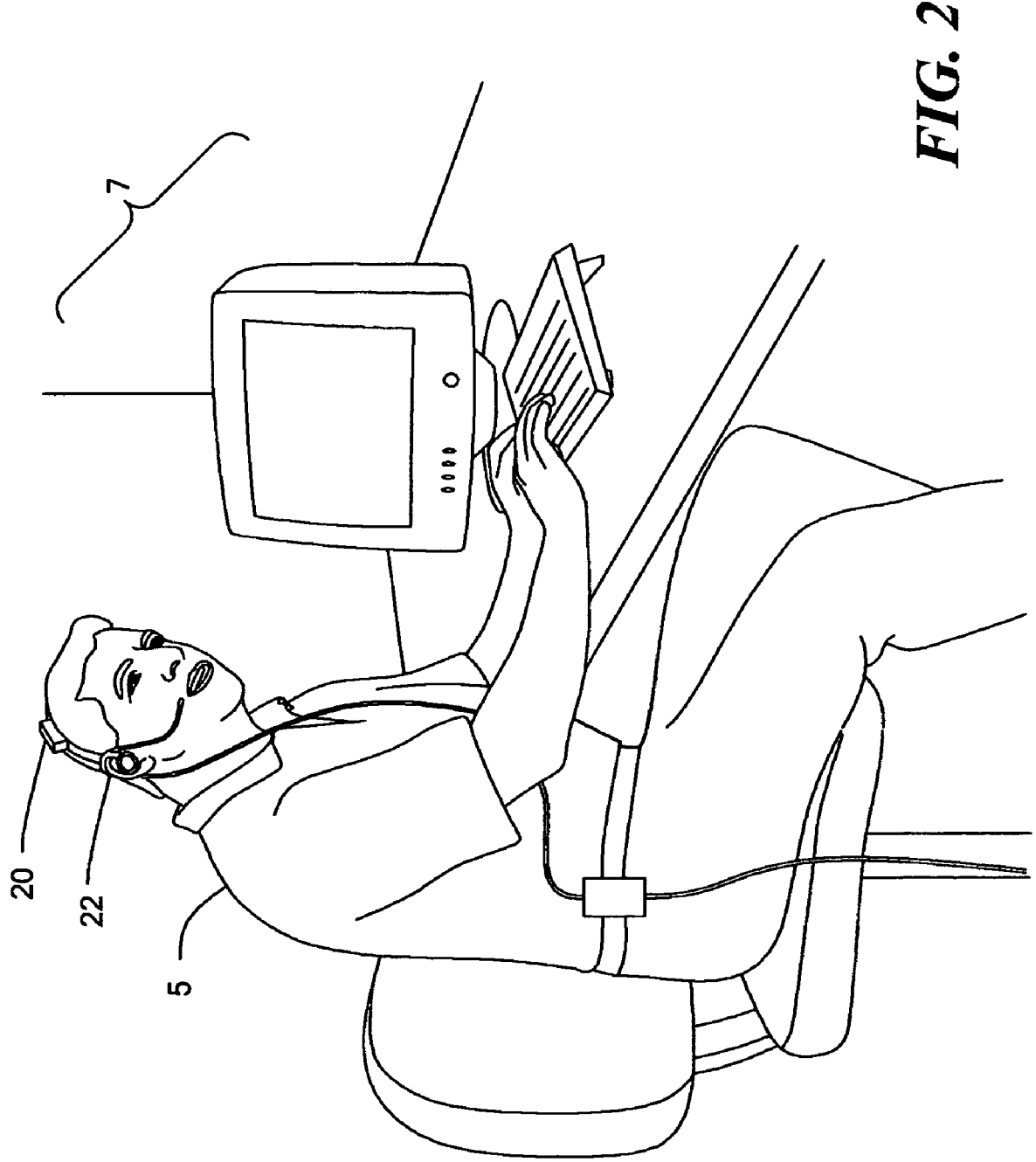
FIG. 2 shows a call center agent wearing a telephone headset, with an agent sensor located in the headset.

In another embodiment of the disclosed system, illustrated in FIG. 2, a call center agent 5 is shown wearing a telephone headset 22, with an agent sensor 20 located in a telephone headset 22. The agent sensor 20 is operative to detect when the telephone headset 22 is opened and/or closed, thus detecting when the telephone headset 22 is placed on the head of the call center agent 5 and/or removed from the head of the call center agent 5. The agent sensor 20 of FIG. 2 may be embodied using any specific type of sensor device, such as a mechanical sensor operable to determine when the telephone headset 22 is opened or closed, or a thermal sensor to detect when the telephone headset is mounted on the head of the call center agent 5, or some other specific type of sensor.

When the agent sensor 20 detects that the agent 5 has the telephone headset 22 mounted on his or her head, a signal or message is sent to a call processing system in the call center indicating that the agent 5 is available to receive calls at the call center station 7. When the agent sensor 20 detects that the agent 5 has removed the telephone headset 22 from his or her head, the agent sensor 20 sends another signal or message indicating that the agent 5 is not available to receive calls at the call center station 7. Communications between the agent sensor 20 and the call processing system in the call center may be supported through any appropriate type of communication system, such as a wired or wireless Local Area Network (LAN) interconnecting the agent sensor 20 and the call processing system.

Figure 3:
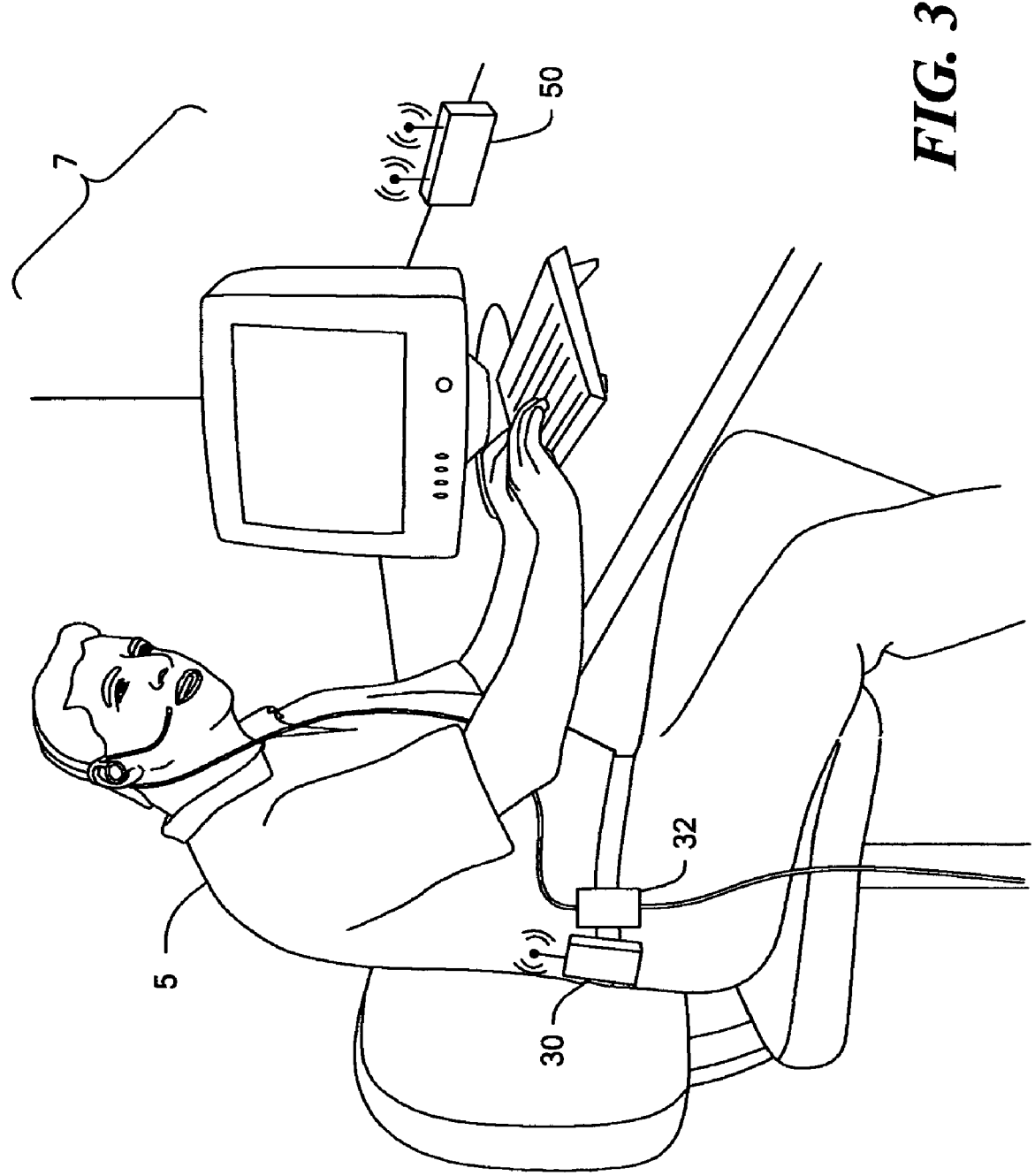
FIG. 3 shows a call center agent wearing a communication device, which determines the agent's current position and may use wireless communications to communicate with a call center computer system that monitors the positions of all agents in the call center.

FIG. 3 shows a call center agent wearing a wireless communication device 30 operable to communicate a current physical position of the agent to a call processing system. For example, the communication device 30 may be a global positioning system (GPS) device, worn for example on the agent's belt 32. In the case where the communication device 30 is a GPS device, the communication device 30 determines the agent's current position, and uses communication circuitry within it, such as wireless local area network communication circuitry, to communicate with a call center processing system that monitors the positions of one or more agents within the call center facility. As it is generally known, GPS is a satellite-based radio navigation system run by the U.S. Department of Defense that uses satellites for identifying earth locations, by triangulation of signals from three satellites. A GPS receiving unit embodied in the communication device 30 shown in FIG. 3 can determine its current location anywhere on earth, and then communicate this position to the call processing system using wireless communication technology, for example facilitated through a wireless local area network (WLAN) access point 50 located proximate to the agent's work area.

Alternatively, the communication device 30 may be embodied to periodically broadcast a signal, for example what is generally known as a "beacon" message, that may be received by the access point 50. Receipt of the signal by the access point 50 allows the access point 50 to determine whether the agent 5 is within the work area, shown for purposes of illustration as the area around the call station 7. In either the GPS or beacon message embodiment described in connection with FIG. 3, the communication device 30 may further be configured to additionally communicate the identity of the agent through the wireless communication system to the call processing system, thus supporting a login procedure that facilitates routing of specific types of calls to appropriate and available agents.

Figure 4:
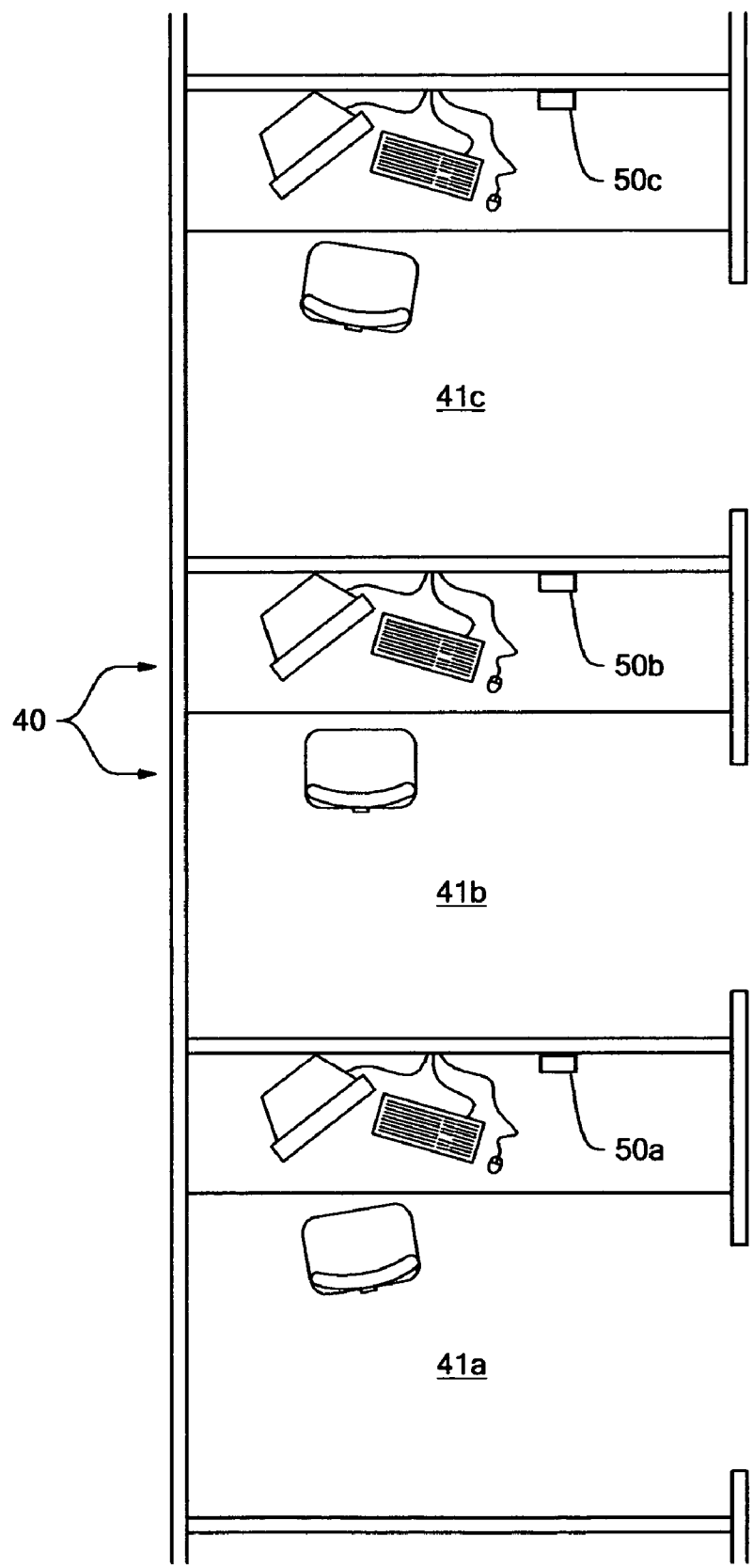
FIG. 4 shows an overhead view of a call center having communication devices operative to receive messages from agent sensor devices worn by or carried by call center agents.

FIG. 4 shows an over head view of an area 40 within a call center having wireless local area network communication devices 50a, 50b and 50c, such as, for example, WLAN access point devices, operative to receive wireless communication network messages from communication devices worn by call center agents. As shown in FIG. 4, the access point 50a is configured to receive wireless communication signals from an agent while that agent is physically located within the work area 41a, the access point 50b is configured to receive wireless communication signals from an agent while that agent is physically located within the work area 41b, and the access point 50c is configured to receive wireless communication signals from an agent while that agent is physically located within the work area 41c.

Figure 5:
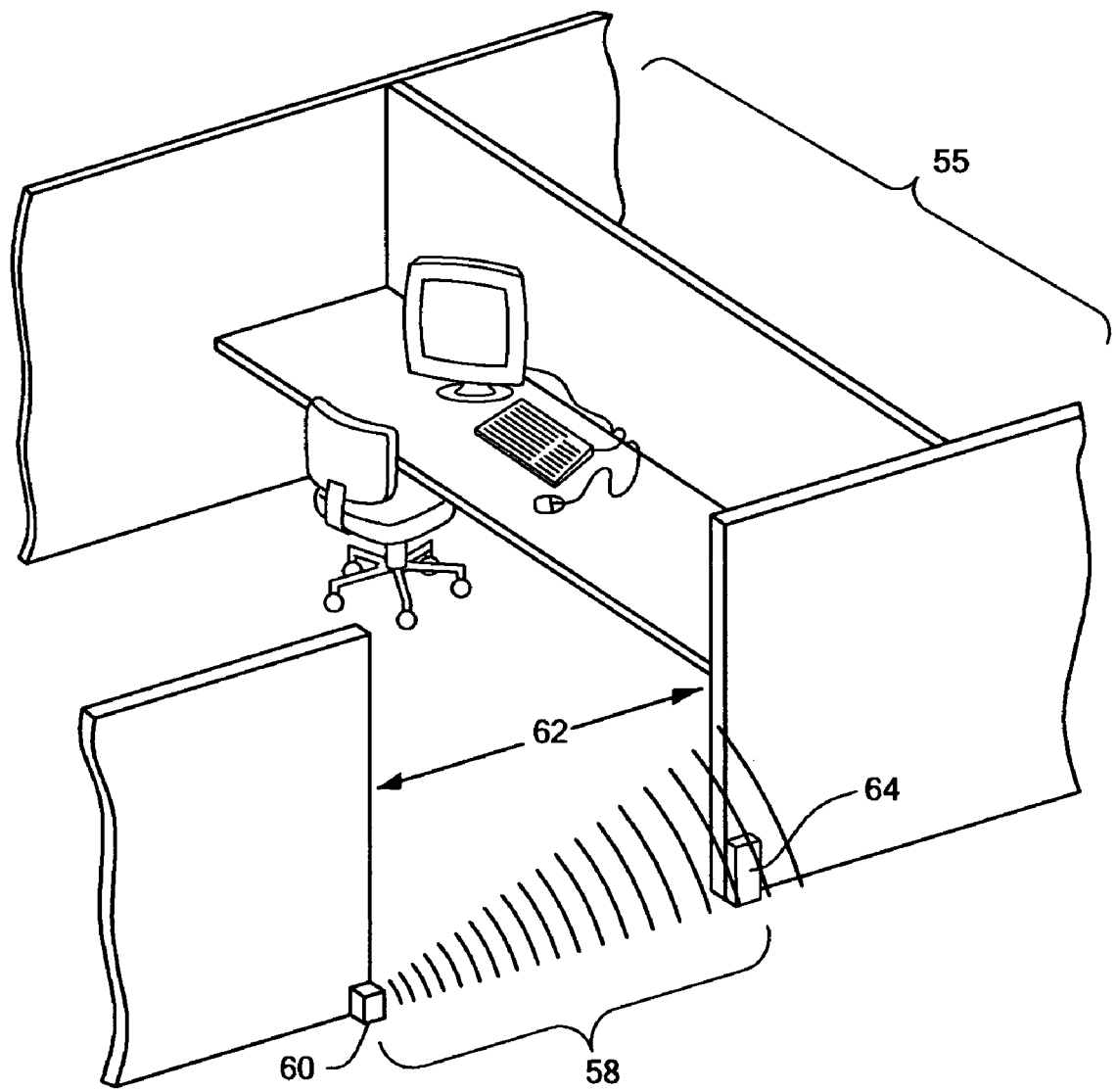
FIG. 5 shows a work area for a call center agent having at least one beam generated by a beam generating device passing across a path into and out of a work area, so that the disclosed system can detect when the agent leaves or enters the work area in the event that the beam is broken.

FIG. 5 shows a work area 55 for a call center agent having at least one beam 58 generated by a beam generating device 60. The beam 58 traverses a path or entryway 62 into the work area 55. The beam 58 is broken or reduced in strength when the agent enters or leaves the work area 55, and a beam receiving device 64 detects when the beam 58 has been broken or reduced in strength below a predetermined threshold. The beam 58 may be any appropriate type of beam, such as an optical beam, a radio frequency beam, or other specific type of beam that can be used to determine when a person has crossed the beam and entered or left the work area 55.

Thus the disclosed system keeps track of when an agent enters and/or leaves the work area 55 based on detecting when the beam 58 is broken. Accordingly, a signal or message is generated and sent to a call processing system for the call center, indicating the presence and/or absence of the agent with respect to the work area 55, based on the monitoring of the beam 55 that traverses the path or entryway to the work area 55.

Figure 6:
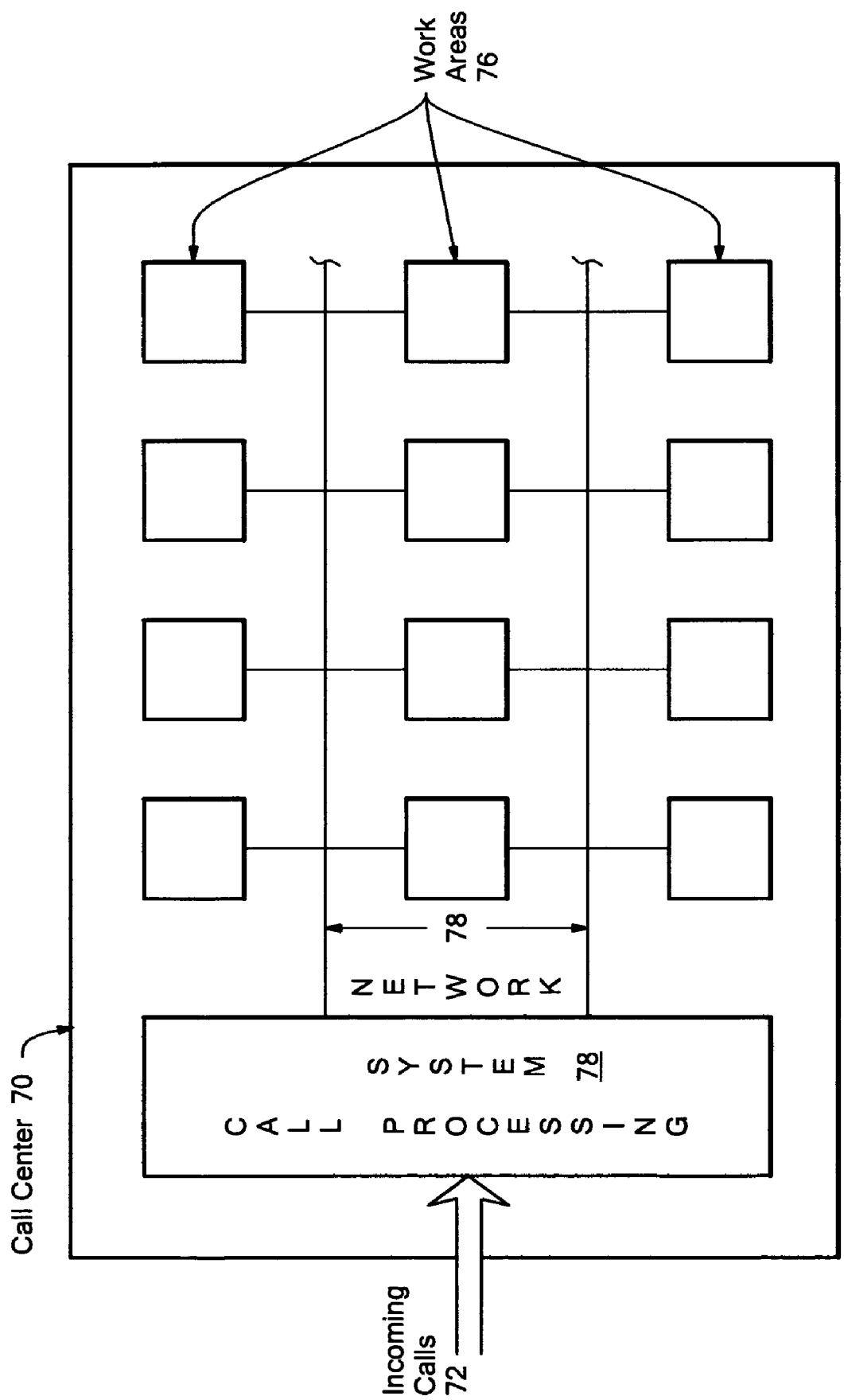
FIG. 6 shows a call center call processing system for receiving calls and routing the calls to appropriate call center agents based on information received from agent sensors.

FIG. 6 shows an illustrative embodiment of a call center call processing system for receiving calls and routing the calls to appropriate call center agents based on information received from one or more of the disclosed agent sensor devices. As shown in FIG. 6, a call center 70 includes a call processing system 74 operative to receive incoming telephone calls 72. The call processing system 74 may, for example, include one or more computer systems or server systems, coupled to one or more Automatic Call Distributors (ACDs). For example, the disclosed system may include an ACD consisting of a computerized phone system that responds to each of the incoming calls 72 with a voice menu, and that connects each call to an appropriate agent working at one of the work areas 76 in the call center 70. During operation of the disclosed system, signals or messages from agent sensors in the call center, or messages generated from signals or messages received from the agent sensors, are communicated via the communication network 78 to the call processing system 74. Based on such messages, the call processing system 74 is able to determine whether agents are currently available in specific ones of the work areas 76. Additionally, the call processing system 74 may operate to log in agents based on information received in messages from the agent sensors.

Figure 7:
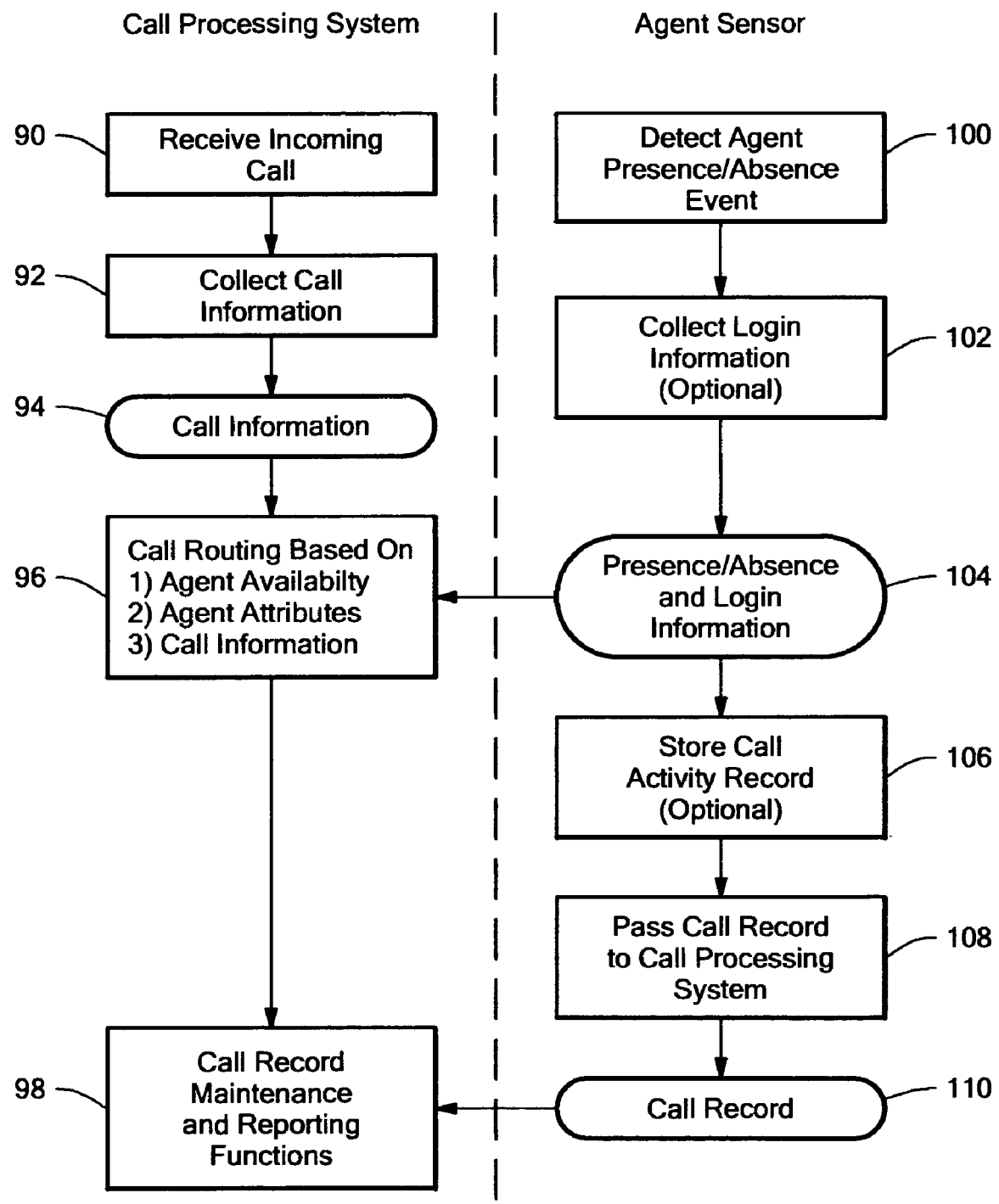
FIG. 7 is a flow chart illustrating steps performed in processing received calls based at least in part on agent location and identity information determined from one or more agent sensors.

FIG. 7 is a flow chart illustrating steps performed in processing received calls based at least in part on agent location and identity information determined from one or more agent sensors. The order of the steps shown in FIG. 7 is for purposes of illustration only, and those skilled in the art will recognize that the steps may be performed in various other specific orders.

At step 100, an agent sensor detects an event indicating that an agent has either become available to receive a call, or has become unavailable to receive a call. The agent sensor may further optionally operate to provide and/or collect login information, such as agent name and password, at step 102. The agent presence information 104, which may optionally contain agent login information, is then transmitted to the received call processing system so that it is available to be used as a basis for call routing by the call processing system at step 96, as further described below.

At step 90, the call processing system receives an incoming call. At step 92, the call processing system collects call information provided by the caller, such as the number dialed, menu selections, etc. The call information 94 is then used at step 96 for call routing. At step 96, the call processing system performs routing of the received call based on: 1) agent availability, as may be determined at least in part based on the presence and login information 104 received from the agent sensor, 2) agent attributes stored in an internal database, such as languages supported, product or service expertise, etc., and 3) the call information 94. Call routing at step 96 causes a telephone device located in a work area of the call center to indicate, for example by ringing or lighting up, that a call is to be answered by the agent that is physically present in that work area.

After the call has been routed to the appropriate agent at step 96, a call record may be generated consisting of a recording of some part of the call, or indications made by the answering agent regarding the subject matter of the call, such as sales performed, identification of the client that made the call, etc. The call record may optionally be stored in some part of the agent sensor device at step 106. At step 108, the agent sensor may pass the call record 110 to the call processing system so that it can be used for call record maintenance and report generation functions at step 98. At step 98, the call processing system may generate reports using the call information 94 and the call record 110.

The disclosed system may be embodied to use any specific type of sensor that operates to detect that an agent has become unavailable for receiving calls, and that may also operate to detect when the agent has again become available to receive calls. For example, an agent sensor may include a camera mounted in a work area, and that records images of an agent. The images recorded by such a camera may be digitized, and analyzed using image processing software or hardware to determine the presence, absence, and/or identity of the agent currently in the work area. For example, agent identity may be determined based on biometrics derived from or extracted from the recorded images. In some embodiments, the disclosed system may use such biometric information to perform a biological identification of an agent based on the agent's biometric profile. Accordingly, the disclosed system may include software and/or hardware functionality within the agent sensor that is operable to analyze characteristics of structure and/or of action in the recorded images, or as otherwise detected using appropriate types of sensor devices. Such biometrics may, for example, include iris and retinal patterns, hand geometry, and/or fingerprints, obtained using appropriate agent sensor devices for the specific biometrics used. For example, to obtain an iris pattern, a device for obtaining an iris scan may be used, to obtain a retinal pattern, a device for obtaining a retinal scan may be used, to obtain a finger print, a device for obtaining a finger print scan may be used, and to obtain a hand geometry scan, a device for obtaining a hand geometry scan may be used, etc.

Another possible identifying technique that may be used by the disclosed system is automated face recognition, which provides the ability to recognize people by their facial characteristics. For example, the disclosed system may employ a system such as the Eigenface algorithm, which maps the characteristics of a person's face into a multidimensional face space. Software and/or hardware within the agent sensor and/ or call processing system computers may be configured or embodied to conduct facial database searches and/or perform live verifications. Facial recognition may be employed in an embodiment of the disclosed system to perform agent identification for purposes of agent login simply by requiring agents to look into a Web camera positioned within a work area whenever they enter the work area. As it is generally known, a Web camera is a video camera that is used to send periodic images or continuous frames to a Web site for display. Web camera software captures the images as JPEG or MPEG files and uploads them to a Web server operating in the call processing system.

In another possible embodiment, the disclosed system may include an agent sensor device mounted in a work area that allows an agent to swipe a card through it, where the card is based on what is generally referred to as a "smart card" technology, and thus logging the agent in. As it is generally known, smart card technology has been employed to produce credit cards with built-in microprocessors and memories. This type of built in technology can be used in embodiments of the present invention for agent identification purposes, to identify an agent to the call processing system through an agent sensor device. When the call center agent inserts their personal card into an agent sensor including at least a smart card reader, and located in an associated work area of the call center, the agent sensor transfers agent presence and identification data to a central computer within the call processing system for the call center. For example, smart card readers (also referred to as smart card "scanners") may be deployed adjacent to or within each work station, or at the doors to a secure work environment into which agents are allowed upon successful scanning of their cards and validation of the agent identification information stored in the cards. The information sent to the central computer from the smart card reader may include an identifier of the agent, as well as an identifier of the work area in which the agent swiped their card. Additionally, the card reader of the disclosed agent sensor may further be mounted or installed within a telephone set of the work station or within the headset itself. Moreover, the disclosed system may be embodied to allow an agent to insert their card device into a reader mounted or installed within the telephone of the work area.

In another embodiment, the agent sensor may include a reader operable to receive a USB (Universal Serial Bus) compatible flash memory device, such as what are generally referred to as memory stick types of devices. Such an agent sensor may, for example, include or provide a USB port provided on the telephone of the work area. A memory stick is just one example of a portable flash memory card that may be used in the disclosed system for this purpose.

In the disclosed system, the portable flash memory device may include some type of appropriate security functionality making it unusable on another system. For example, the information stored in the portable device may be "locked" using some form of encryption, so that it cannot be used in other systems. The agent sensor or call processing system in such an embodiment is accordingly configured with such decryption key or keys that allow the information on the portable device to be decrypted and used. Such a portable memory device would include an agent identifier and password pre-programmed on it, and would further be used to record the agent's activity on the associated telset. During operation, the agent would thus sit down at a desk, drop in their portable memory device into a slot and leave it in there while they handle incoming phone calls. While the card is in the slot, the agent is logged into the call processing system, and available to receive calls. The portable memory device stores all of the agent's call related activity into memory. When the agent logs out at the end of the day, they remove the portable memory device from the slot, and return it to their supervisor. The supervisor then plugs the portable memory into another device that downloads the contents to a database within the call processing system for future reference or report generation. The database and portable memory device may be provided with security functions that ensure that can communicate only to each other if desired. In this way, the disclosed system may be embodied to allow for robust reporting capabilities, since it could log every event the agent performed while at work.

As a further enhancement, the portable memory device may be embodied or configured to have a telephone extension or dialed number (DN) stored on it, as well as any other custom settings that are associated with the agent, such as pre-programmed keypad keys or key combinations, etc. For example, a pre-programmed key may be a user (or administratively) configured short-cut key on the telset. Two different users on two different DNs may have two different sets of pre-programmed keys. Pre-programmed keys can initiate a feature session, dial an internal or external number, or perform some other action. In the disclosed system, the configuration of such pre-programmed keys for an agent may be stored on their portable memory device. When an agent logs into a phone with their portable memory device, the phone will load their pre-programmed keys so that everything is exactly as they want it to be even if they are working at a different desk than they previously used. This set of loaded information may also include other information, such as the agent's extension number.

Accordingly, if an agent decides they want to sit and work in a given work area, which may be different from their usual work area, and/or different from the work area they last worked in, they can simply go to the desired work area, and insert their portable memory device into the agent sensor, which causes the telephone equipment in that work area to take on all of the agent's settings, and his or her extension number. In this way, all of the agent's attributes and pre-programmed keys will follow the agent, as well as the agent's extension number. At the end of the day, the agent can remove or unplug their portable memory device from the agent detector, causing the agent to be logged out of the call routing system. The telephone equipment could also lock itself so that it cannot be used by another agent if so desired.

In another embodiment of the disclosed system, an agent sensor device may include a device operable to capture information from a radio-frequency identification tag ("RFID") that the agent can carry with them. The RFID tag carried by the agent is based on data collection technology that uses electronic tags to store identification data. The agent sensor would accordingly include a wireless transmitter gun that operates to capture information represented on the tag. The tag, which is also known as an electronic label, transponder or code plate, may, for example, obtain its power from the transmitter gun. In the disclosed system, the RFID tag may be used to store the agent's identifier and other login information and or attributes. The RFID reader of the disclosed system need not be embodied using a separate box or device. The RFID reader could be incorporated in the telephone equipment, such as within the headset electronics for, or associated with, the work area. It could also be located at the work area entrance, or incorporated into the work area computer system.

The disclosed system may be embodied to use read-write or read-only RFID technology. If read-write RFID technology is used, information may be added to the portable device, or written over existing information on the portable device, using an agent sensor that includes an appropriate reader or interrogator. Alternatively, read-only RFID tags may be used that have information stored on them during the manufacturing process. However, the information on read-only chips may not be changeable. Another embodiment of the disclosed system may use electrically erasable programmable read-only tag memory, or EEPROM, which also allows the data on the tag to be overwritten.

While the above description is provided with reference to detecting the presence and optionally automatically detecting the identity of an agent in a call center for login purposes, those skilled in the art will recognize that the present invention is not so limited. Accordingly, the present invention may be applied in any context in which a telephone system can operate in some way responsive to information describing the presence or absence, as well as the identity of, persons in a building or buildings having work areas or stations to which telephone calls may be routed, or otherwise processed based on such automatically detected information.

The above description of the preferred embodiments include a flowchart and a block diagram illustration of methods, apparatus (systems) and computer program products according to an embodiment of the invention. Those skilled in the art will recognize that the specific orders of steps shown in the flow chart are given purely for purposes of illustration, and that the actual order in which the described operations are performed may vary between embodiments, configurations, or based on specific operational conditions. It will be further understood that each block of the flowchart and block diagram illustrations, and combinations of blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

Finally, while the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

We claim:

1. A system for controlling call routing to an agent in a call center, comprising:
   at least one agent sensor operative to determine that said agent has become unavailable to receive calls routed to telephone equipment located within a work area, responsive to said agent sensor detecting at least one unavailability event, said unavailability event indicating that said agent is leaving said work area, and wherein said at least one agent sensor is further operative to send a first signal to a received call routing system, responsive to said detecting that said agent has become unavailable to receive calls routed to said telephone equipment located within said work area, said first signal indicating to said received call routing system that said agent has become unavailable to receive calls routed to said telephone equipment located within said work area; and
   wherein said agent sensor is further operative to receive a portable data storage device associated with said agent and to store in said portable data storage device a call record describing activities associated with a call routed by said received call routing system to said telephone equipment located in said work area.

2. The system of claim 1, wherein said at least one agent sensor comprises a sensor device mounted on seating equipment, and wherein said sensor device is operable to detect when said agent is seated in said seating equipment.

3. The system of claim 1, wherein said at least one agent sensor comprises a sensor device mounted in a telephone headset, and wherein said sensor device is operable to detect when said agent is wearing said telephone headset.

4. The system of claim 1, wherein said at least one agent sensor comprises a wireless communication transmitting device located proximate to said agent, wherein said wireless communication transmitting device is operable to transmit at least one message to a wireless communication receiving device located within said call center, and wherein said at least one message is indicative of a current physical location of said agent.

5. The system of claim 4, wherein said at least one message comprises information describing a current physical location of said agent.

6. The system of claim 4, wherein said at least one message comprises at least one beacon message, and wherein said wireless communication receiving device determines said current physical location of said agent responsive to a signal strength of said at least one beacon message.

7. The system of claim 4, wherein said wireless communication transmitting device is further operable to determine said current physical location of said agent responsive to a global positioning system.

8. The system of claim 4, wherein said wireless communication transmitting device is wearable by said agent.

9. The system of claim 4, wherein said wireless communication transmitting device is carried by said agent.

10. The system of claim 1, wherein said at least one agent sensor is operable to determine when said agent crosses a beam located proximate to said work area.

11. The system of claim 10, wherein said beam is an optical beam, and wherein said at least one agent sensor comprises at least one optical beam generator.

12. The system of claim 1, wherein said at least one agent sensor is further operable to:
   read, from a portable data storage device, login information associated with said agent; and
   transmit at least one message containing said login information to said received call routing system.

13. The system of claim 1, wherein said at least one agent sensor is further operable to:
   determine that said agent has become available to receive calls routed to said telephone equipment located within said work area, responsive to said agent sensor detecting at least one availability event, said availability event indicating that said agent is present within said work area; and
   send a second signal from said agent sensor to a call routing system, responsive to said detecting that said agent has become available to receive calls routed to said telephone equipment located within said work area, said second signal indicating to said call routing system that said agent has become available to receive calls routed to said telephone equipment located within said work area.

14. The system of claim 1, wherein said determination that said agent has become available to receive calls to said telephone equipment located within said work area further comprises reading, by said agent sensor, from said portable data storage device associated with said agent, at least one call processing parameter, and wherein telephone equipment located in said work area are configured based on said at least one call processing parameter responsive to said reading of said portable data storage device.

15. The system of claim 14, wherein said at least one call processing parameter comprises at least one of the group consisting of a telephone extension associated with said telephone equipment located in said work area and preprogrammed keypad key information.

16. The system of claim 1, wherein said determination that said agent has become unavailable to receive calls routed to said telephone equipment located within said work area includes detecting, by said agent sensor, that said portable data storage device associated with said agent has been removed from said agent sensor.

17. The system of claim 1, wherein said at least one agent sensor is further operable to automatically identify said agent based on biometric information.

18. The system of claim 17, wherein said at least one agent sensor includes a camera, and wherein said biometric information is derived from at least one digital image obtained using said camera.

19. The system of claim 17, wherein said biometric information comprises at least one iris pattern, and wherein said agent sensor is operable to perform an iris scan.

20. The system of claim 17, wherein said biometric information comprises at least one retinal pattern, and wherein said agent sensor is operable to perform a retina scan.

21. The system of claim 17, wherein said biometric information comprises hand geometry, and wherein said agent sensor is operable to obtain a hand geometry.

22. The system of claim 17, wherein said biometric information comprises at least one finger print, and wherein said agent sensor is operable to obtain at least one finger print scan.

23. The system of claim 12, wherein said portable data storage device comprises a smart card, and wherein said agent sensor is located proximately to said work area.

24. The system of claim 12, wherein said portable data storage device comprises a smart card, and wherein said agent sensor is located proximate to a secure work environment containing said work area.

25. The system of claim 1, wherein said agent sensor is further operable to upload said call record from said portable data storage device to said received call processing system for purposes of subsequent report generation.

26. The system of claim 1, wherein information stored on said portable storage device is encrypted, and wherein said agent sensor is operable to decrypt said information.

27. A method for controlling call routing to an agent in a call center, comprising:
  determining, by at least one agent sensor, that said agent has become unavailable to receive calls routed to telephone equipment located within a work area, responsive to said agent sensor detecting at least one unavailability event, said unavailability event indicating that said agent is leaving said work area; and
  sending, by said at least one agent sensor, a first signal to a received call routing system, responsive to said detecting that said agent has become unavailable to receive calls routed to said telephone equipment located within said work area, said first signal indicating to said received call routing system that said agent has become unavailable to receive calls routed to said telephone equipment located within said work area;
  receiving, by said agent sensor, a portable data storage device associated with said agent; and
  storing in said portable data storage device a call record describing activities associated with a call routed by said received call routing system to said telephone equipment located in said work area.

28. A system for controlling call routing to an agent in a call center, comprising:
  means for determining, by at least one agent sensor, that said agent has become unavailable to receive calls routed to telephone equipment located within a work area, responsive to said agent sensor detecting at least one unavailability event, said unavailability event indicating that said agent is leaving said work area;
  means for sending, by said at least one agent sensor, a first signal to a received call routing system, responsive to said detecting that said agent has become unavailable to receive calls routed to said telephone equipment located within said work area, said first signal indicating to said received call routing system that said agent has become unavailable to receive calls routed to said telephone equipment located within said work area;
  means for receiving, by said agent sensor, a portable data storage device associated with said agent; and
  means for storing in said portable data storage device a call record describing activities associated with a call routed by said received call routing system to said telephone equipment located in said work area.

* * * * *